Sept. 28, 1965  A. H. LAIDIG ETAL  3,208,602
TRANSFER DEVICE
Filed March 11, 1964  5 Sheets-Sheet 1
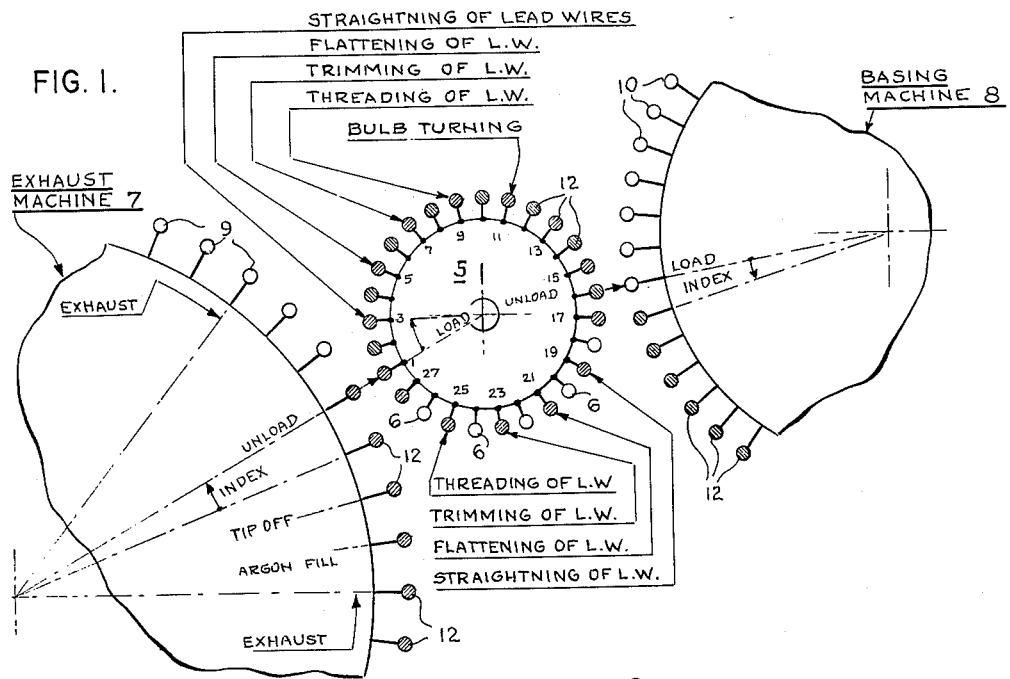
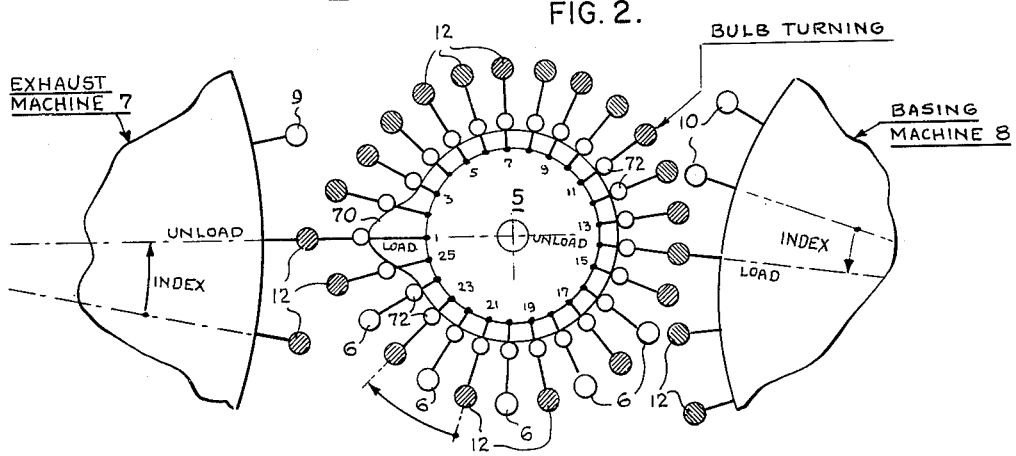
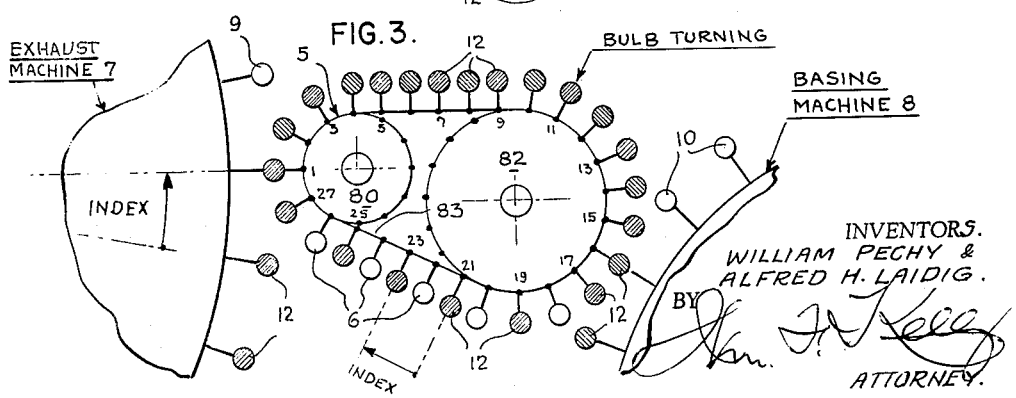
INVENTORS.
WILLIAM PECHY &
ALFRED H. LAIDIG.
BY
ATTORNEY.

Sept. 28, 1965     A. H. LAIDIG ETAL     3,208,602
TRANSFER DEVICE
Filed March 11, 1964     5 Sheets-Sheet 2
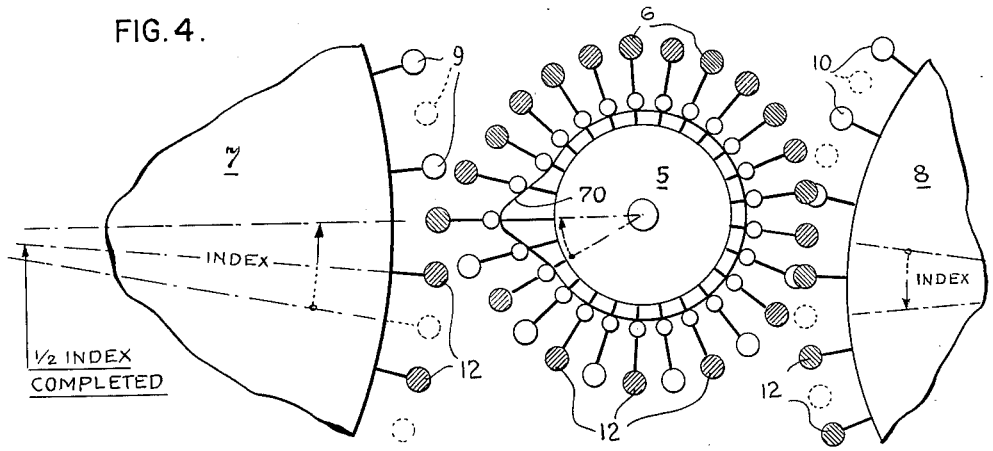
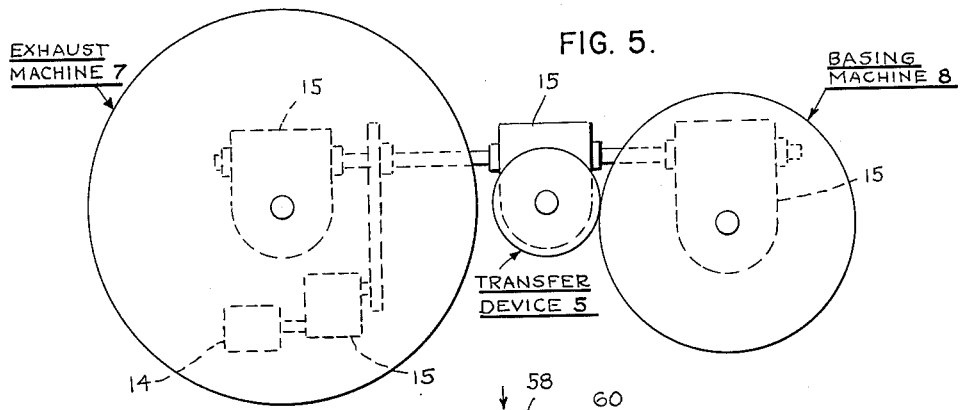
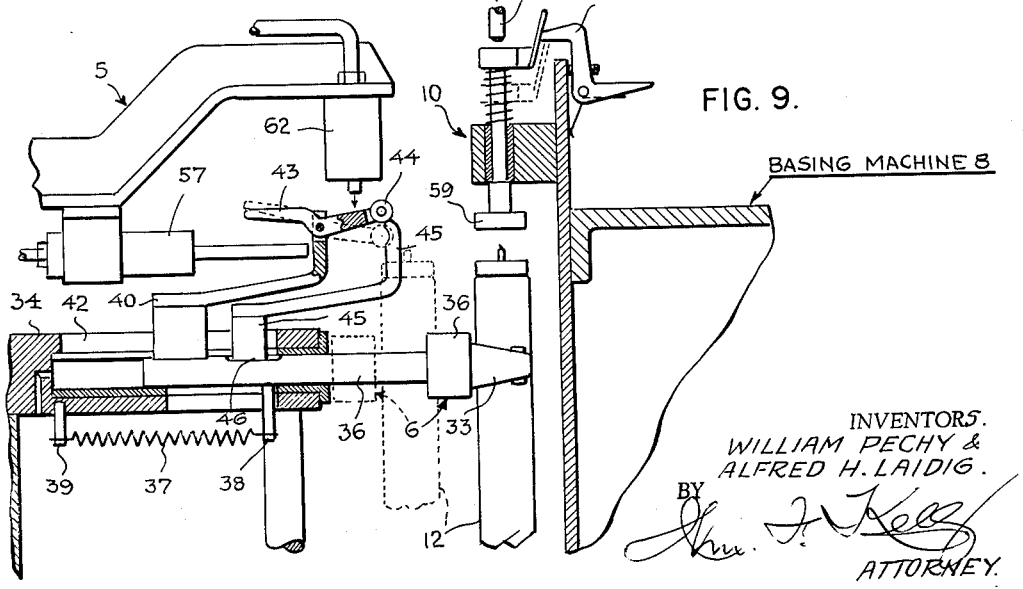
INVENTORS.
WILLIAM PECHY &
ALFRED H. LAIDIG.
BY
ATTORNEY.

Sept. 28, 1965  A. H. LAIDIG ETAL  3,208,602
TRANSFER DEVICE
Filed March 11, 1964  5 Sheets-Sheet 3

INVENTORS.
WILLIAM PECHY &
ALFRED H. LAIDIG.
BY
ATTORNEY

Sept. 28, 1965 A. H. LAIDIG ETAL 3,208,602
TRANSFER DEVICE
Filed March 11, 1964 5 Sheets-Sheet 4
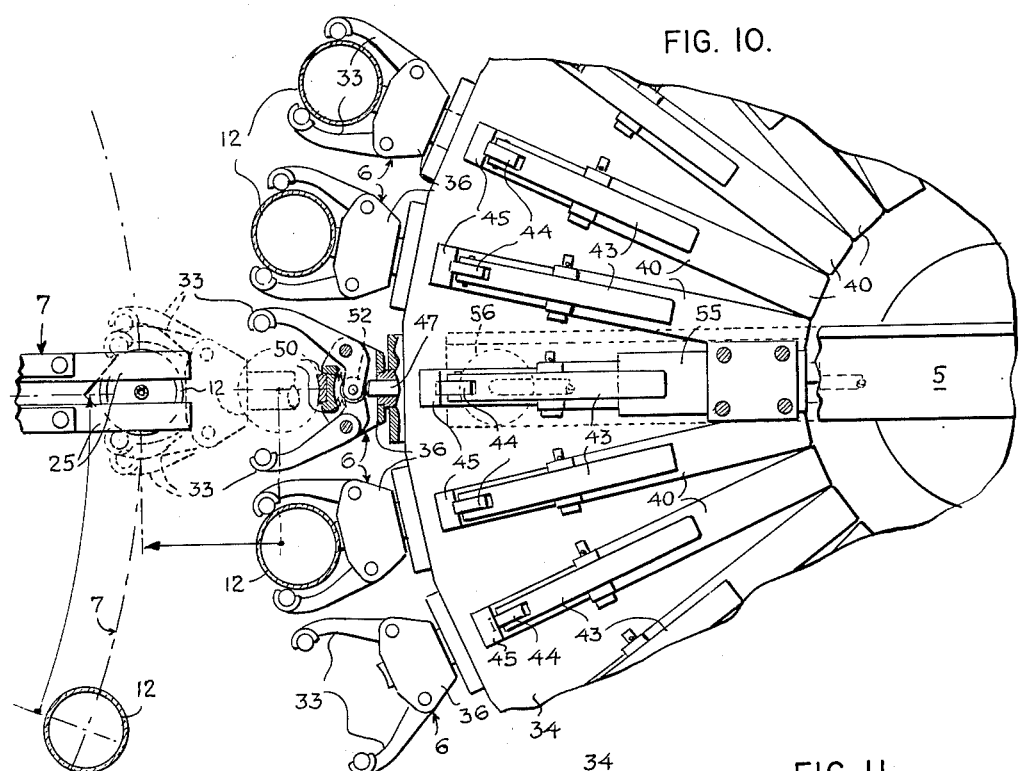
FIG. 10.
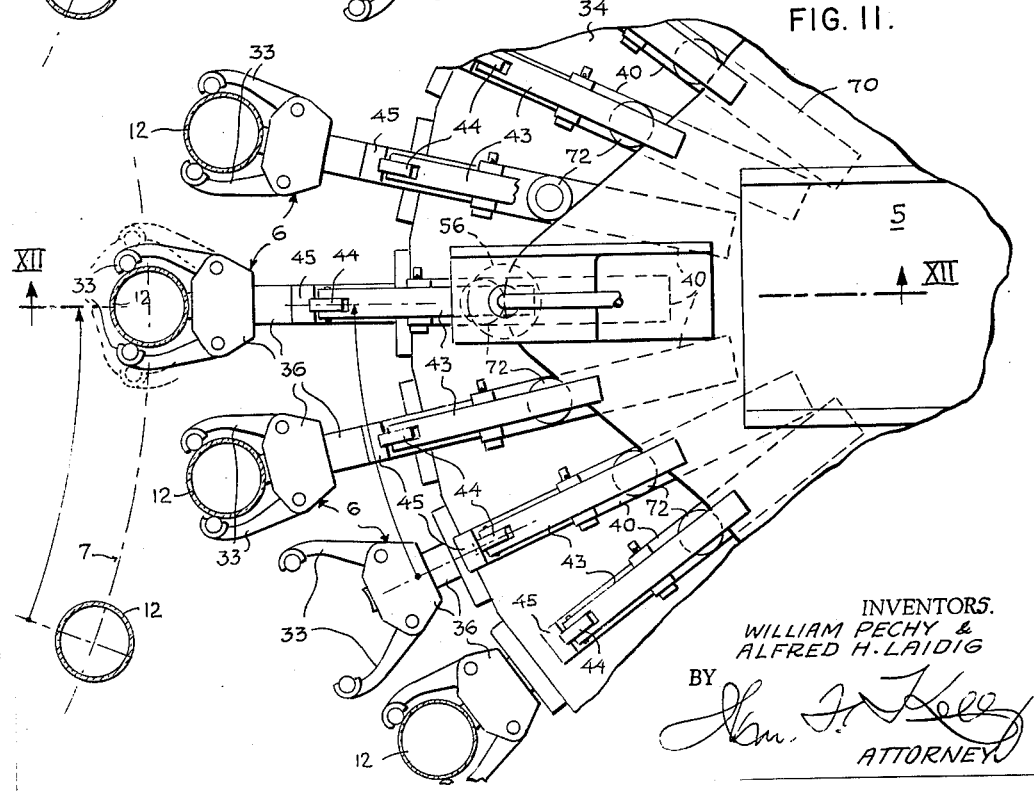
FIG. 11.
INVENTORS.
WILLIAM PECHY &
ALFRED H. LAIDIG
BY
ATTORNEY Sept. 28, 1965  A. H. LAIDIG ETAL  3,208,602
TRANSFER DEVICE Filed March 11, 1964  5 Sheets-Sheet 5

INVENTORS
WILLIAM PECHY &
ALFRED H. LAIDIG.
BY
ATTORNEY.

United States Patent Office 3,208,602
Patented Sept. 28, 1965

3,208,602
TRANSFER DEVICE
Alfred H. Laidig, Bloomfield, and William Pechy, Wall Township, N.J., assignors to Westinghouse Electric Corporation, East Pittsburgh, Pa., a corporation of Pennsylvania
Filed Mar. 11, 1964, Ser. No. 350,984
8 Claims. (Cl. 214—1)

The present invention relates to a compact automatic transfer device for transferring articles from one machine to another and wherein the transfer device carries an uneven number of article supporting heads to facilitate the performance of work upon the articles on opposite sides of the transfer device.

Heretofore in the manufacture of articles, such as fluorescent electric lamps, it has been the custom to utilize a group of equipment comprising an exhaust machine and a basing and seasoning machine, each provided with heads for holding the lamps, and a transfer device which removes a lamp, one at a time, from the exhaust machine and deposits such lamp in the basing and seasoning machine preparatory to completing production of the lamp. During transit of each lamp from one machine to the other by the transfer device, certain fabricating steps are performed on the partially completed lamp which has heretofore required a transfer device of substantially the same proportions as the exhaust and basing machines thus making the entire lamp making group of appreciable floor area dimension.

The present invention has for its primary purpose the provision of an automatic transfer device of compact dimensions wherein an uneven number of article supporting heads are provided which are indexed through a path greater than 360° thus enabling fabrication steps to be performed on the article during transit from both sides of the transfer device.

Another object of the present invention is the provision of an automatic transfer device for transferring articles from one machine to another and which transfer device automatically compensates for difference in the spacing between the article supporting heads of the two machines.

A further object of the present invention is the provision of an automatic transfer device for transferring articles from one machine to another wherein such device is provided with an uneven number of article supporting heads which index two stations at a time so that as one odd number head is being located at its pick-up station an even number head is being unloaded at its discharge station.

The foregoing objects of the present invention, together with other objects which will become obvious to those skilled in the art from the following description, are achieved by providing an automatic transfer device for transferring articles from one machine to another which is particularly adaptable to the manufacture of fluorescent electric lamps. Such transfer device picks up a partially fabricated lamp from a station to which one of the spaced lamp supporting heads of an exhaust machine has indexed and transfers such lamp to a spaced lamp supporting head of a basing and seasoning machine. The lamp supporting heads of the transfer device are of an uneven number and index two stations at a time so that the lamp carried by each head from pick-up to discharge travels through a path greater than 360° thus enabling the transfer device to be of substantial compact design by permitting fabrication operations to be performed on the lamp from both sides of the transfer device during its transit.

The present invention can be readily understood by reference to the accompanying drawings wherein:

FIGURE 1 is a schematic illustration of one embodiment which the automatic transfer device of the present invention may take and showing the lamp supporting heads of the transfer device at its pick-up and discharge indexed positions;

FIG. 2 is a schematic illustration showing a modification of the present invention;

FIG. 3 is a schematic illustration of a still further modification which the present invention may take;

FIG. 4 is a schematic illustration of the present invention similar to FIG. 1 but showing the relative positions of the respective lamp supporting heads of the exhaust machine, transfer device, and basing and seasoning machine, during their simultaneous indexing movement;

FIG. 5 is a schematic illustration of the unitary drive for the lamp producing group;

FIG. 9 is a fragmentary cross-sectional view of one of the lamp supporting heads of the transfer device adjacent a lamp supporting head of the basing and seasoning machine with both such heads in their indexed discharge position;

FIG. 10 is a fragmentary cross-sectional view of the automatic transfer device shown in FIG. 1 taken on line X—X of FIG. 8 in its indexed position adjacent an indexed position of the exhaust machine preparatory to the picking up of a partially fabricated lamp;

FIG. 11 is a fragmentary plan view of the modification of the automatic transfer device shown in FIG. 2 in its indexed pick-up position adjacent an indexed position of a lamp carrying head of the exhaust machine;

Figure 14:
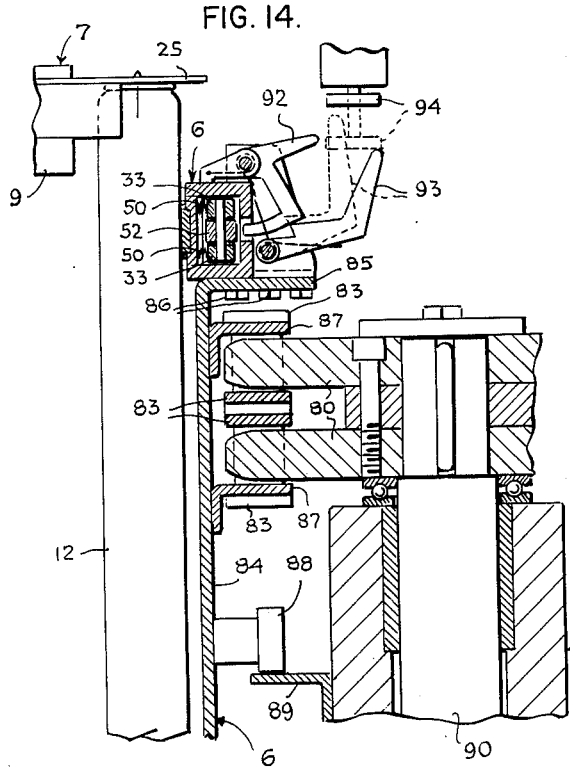
Figure 13:
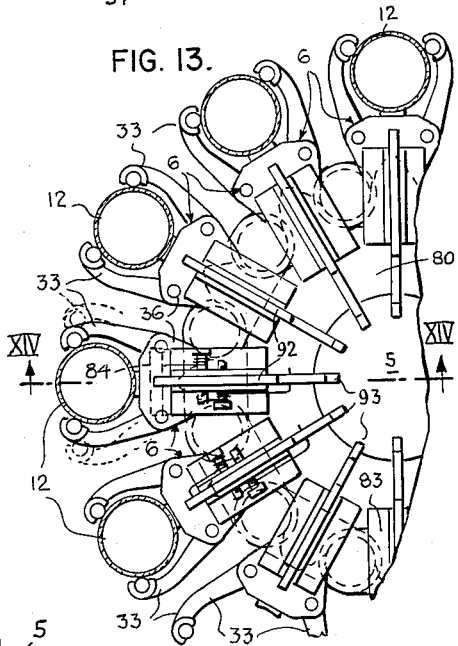

FIG. 13 is a fragmentary plan view of one of the lamp supporting heads of the modification of the transfer device shown in FIG. 3 in its position preparatory to picking up a lamp from an adjacent indexed head of the exhaust machine; and FIG. 14 is a fragmentary cross-sectional view taken on line XIV—XIV of FIG. 13 showing the modification of FIG. 3 in its indexed pick-up position adjacent an indexed head of the exhaust machine.

Referring now to the drawings in detail, the automatic transfer device 5 as therein shown in FIG. 1 is adapted for use in the production of fluorescent electric lamps and comprises a turret or transfer conveyor provided with circumferentially disposed spaced lamp supporting heads 6 preferably of an odd number which as shown comprise a total of twenty-seven heads. Such turret is positioned for indexing between a larger diameter turret 7 of the customary fluorescent lamp exhaust machine and a turret 8 of the usual type basing and seasoning machine. Both the rotating turrets 7 and 8 are similarly provided with circumferentially disposed spaced lamp supporting heads, with the heads 9 of the exhaust machine spaced somewhat farther apart and hence indexing through a greater arc, than the shorter spaced heads 10 of the biasing machine which accordingly index through a somewhat smaller arc.

Figure 6:
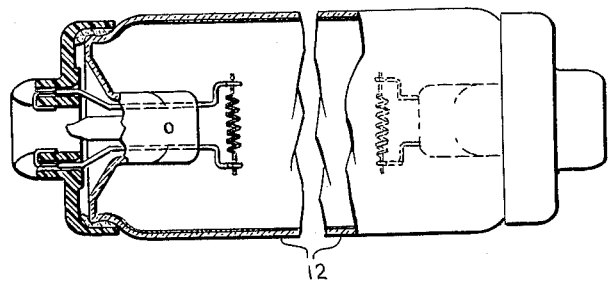
FIG. 6 is a fragmentary drawing of a fluorescent type electric lamp which may be produced by the apparatus of the present invention.
Figure 7:
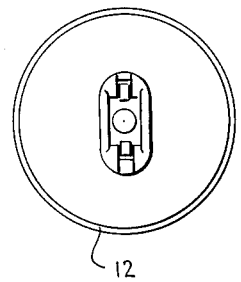
FIG. 7 is an end view of the lamp shown in FIG. 6.

In the usual manner the exhaust machine turret 7 indexes to progressively dispose a lamp supporting head 9 carrying a fluorescent lamp 12 (FIG. 6—and shown as a shaded head in FIGS. 1, 2 and 3) at various stations where such lamp is "exhausted," "argon-filled," "tipped off" and then indexed to its "unload" station preparatory to being picked up by the automatic transfer device 5, as hereinafter described more in detail. Similarly the basing machine 8 receives a partially fabricated lamp 12 by discharge thereof from the transfer device 5 with such lamp being thereafter indexed by the basing machine 8 to various stations, as shown by the shaded heads in FIG. 1, at which the lamps are "seasoned" and the basing cement "cured," in the manner well known in the art. Still referring to FIG. 1, it will be noted that the heads 6 of the transfer device 5 index two at a time resulting in only every other head 6 receiving a discharged partially fabricated lamp 12 from the "unload" or discharge index station of the first or exhaust machine. The head 6 carrying such "received" lamp then indexes through the several stations spaced two heads apart at one side of the transfer device where the several operations as noted by the legends in FIG. 1 are performed.

Upon completion of such operations, the last one of which is the turning of the fluorescent lamp 12 end for end, each lamp so turned is indexed past the "load" or pick-up index station of the basing or second machine 8, and continues its indexing rotation two stations at a time until the inverted lamp carried by the head 6 passes through additional indexed positions on the opposite side of the transfer device 5 where the identical operations are performed on the lamp 12 as indicated by the legends in FIG. 1 except there is no "bulb turning." Thereafter the lamp 12 carried by the heads 6 continues to index two stations at a time and since such heads as before noted are of an odd number, this time the loaded head 6 carrying a lamp 12 bypasses the "unload" index station of the exhaust machine 7 (and hence becomes an "even" number head), as well as such heads by-passing the work stations at the side of the transfer device where operations were first performed, until such loaded head 6 has rotated more than 360° or slightly more than one and one-half times and is then indexed adjacent the "load" index station of the basing machine 8, where the lamp 12 is then transferred from one head 6 to the other head 10.

Accordingly, by providing the transfer device 5 with an odd number of heads 6 indexing two at a time, not only does this enable the performance of work operations on each side of the transfer device but such heads 6 are spaced much closer together thus facilitating operation of the various tooling at every other work performing station on each side without interference, all of which contributes to a decreased diameter of the transfer device and resulting in a much more compact transfer device than heretofore. This enables the entire manufacturing group including the exhaust and basing machines and all of which are simultaneously driven by an indexing means comprising electric motor 14 and suitable gearing 15, as shown in FIG. 5, to require considerably less floor area thus reducing manufacturing costs of the lamps 12. Also, when each head 6 is finally moved into its receiving indexed position adjacent the "unload" station of the exhaust machine 7 to which a lamp carrying head 9 has indexed, as well as when such head 6 aligns with the "load" indexed position of the basing machine head 10, mechanism such as shown in FIGS. 8, 9 and 10 operates to effect transfer of the lamp 12 therebetween.

By reference now to these latter figures the head 9 of the exhaust machine 7 may comprise a structure similar to that as shown and described more in detail in U.S. Patent No. 3,068,909, issued Dec. 18, 1963, and assigned to the same assignee as the present invention. Since such head itself is not a contribution of the present invention it should suffice to say that such head 9 includes a lamp holder 16 for supporting a fluorescent lamp 12 in alignment with an exhaust fitting 17 during the exhaust operation. Such lamp holder comprises a pair of vertical guide rods 18 and 19 affixed to upper and lower mounting plates 20 extending from the turret of the exhaust machine 7. An upper slide 22 and a lower slide 23 are movable longitudinally of these guide rods 18 and 19 under the action of an interconnecting tie-rod 24 carrying a chuck 25 at its upper end. A lower spring-biased chuck 26 is affixed to a sleeve 27 slidable on a further guide-rod 28 so that the lamp holder is movable as a unit by the interconnecting tie-rod 24 vertically of the guide rods 18 and 19. The lower chuck 26 is independently movable downwardly against the tension of the spring 29 by the sliding movement of sleeve 27 on the guide-rod 28 when an arm 30 affixed to the sleeve 27 engages a projecting track 32 carried by the turret of the exhaust machine 7. Such downward movement of the chuck 26 then enables removal or "pick-up" of the lamp 12 from between the upper chuck 25 and lower chuck 26 by the clamping jaws 33 of a head 6 on the transfer device 5, which pick-up means thus transfer the lamp 12 to the dotted line position shown in FIG. 8.

Figure 8:
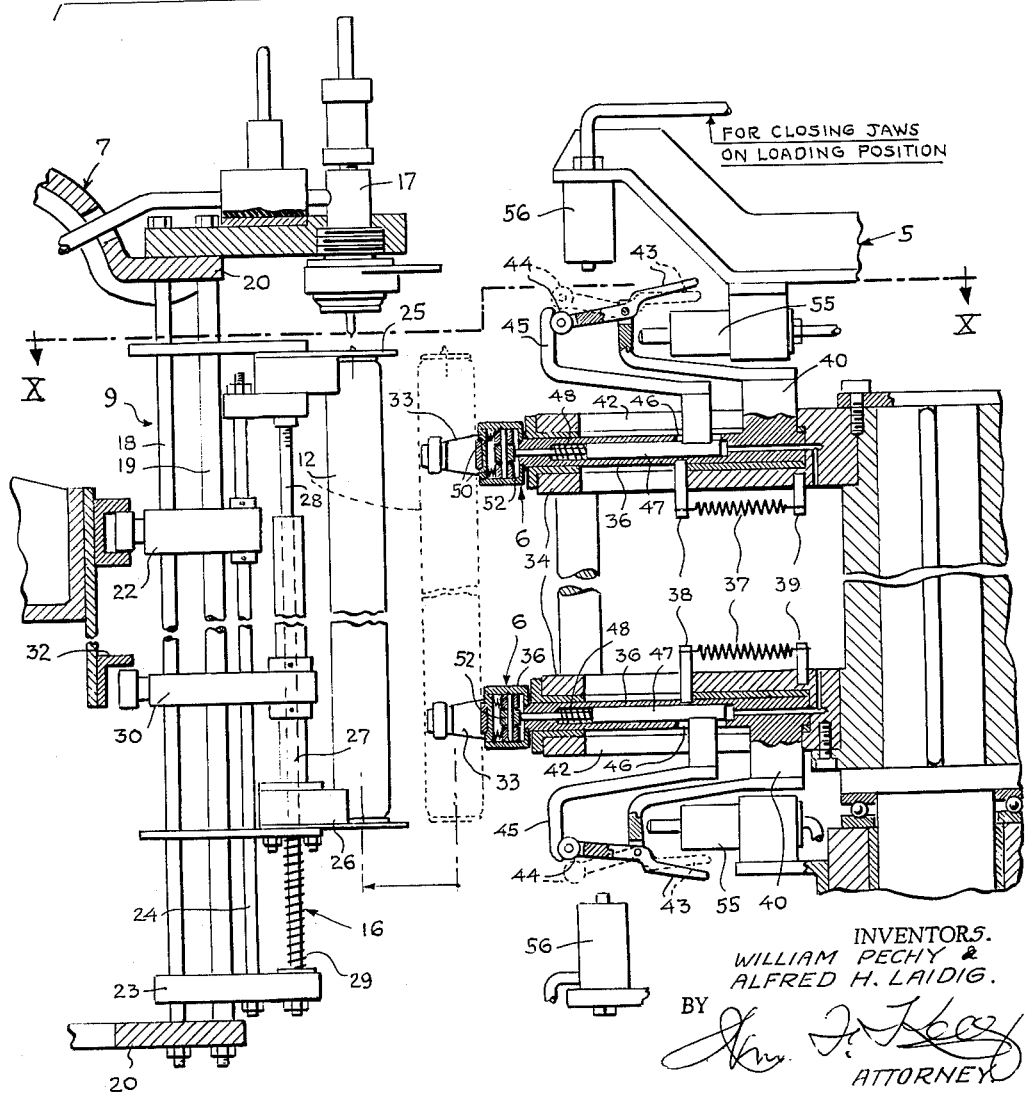
FIG. 8 is a fragmentary cross-sectional view of one of the lamp supporting heads of the transfer device as shown in FIG. 1 adjacent a lamp supporting head of the exhaust machine with both such heads in their indexed pick-up position.

As seen more particularly in FIGS. 8 and 9 each head 6 of the transfer device 5 comprises a pair of spaced turrets 34 hollowed at each station to telescopically receive the head 6 thereat. Since each head 6 is secured to the turrets 34 in the same manner and parts carried thereby are identical, a description of only one should suffice. It is to be understood, however, that the parts of the head 6 operate simultaneously. A main hollow piston 36 is reciprocally movable within the hollow of the turret 34 which is normally biased in its telescoped position, as seen in FIG. 8, by a coil spring 37 connected to a pin 38 projecting from the piston 36 and a similar pin 39 attached to the turret 34. An angularly disposed operating arm 40 projects upwardly from the main piston 36 through a longitudinal slot 42 in the turret 34 and at its upper end carries a pivoted bell-crank lever 43 having a small roller 44 at its outer extremity. In the normally telescoped position of the main piston 36 the small roller 44 engages the slotted end of another angularly disposed operating arm 45 the base of which passes through the slot 42 in the turret 34 and also through a small longitudinal slot 46 in the hollow main piston 36 where it is connected to a small rod-like piston 47 longitudinally movable a short distance within the hollow main piston 36, by the potential energy of a coil spring 48, and the outer end of which contacts a roller 52 riding on one of the clamps 33.

By reference more particularly to FIG. 10 it will be noted that the outer enlarged end of the main piston 36 is provided with the pair of previously mentioned pivoted bell-crank clamping jaws 33 normally biased in their open position by compression springs 50. When one of the empty heads 6 of the transfer device 5 first indexes into its pick-up position thus coinciding with the "unload" position of the exhaust machine head 9 as seen in FIG. 10, the jaws 33 will be open. Upon the head 6 coming to rest at such station an air-piston or the like 55 (FIG. 8) carried by the transfer device 5 is pressurized to cause outward movement of its piston into contact with the angularly extending operating arm 40 of the main piston 36 forcing the latter outwardly of the hollow in the turret 34 and expanding the spring 37 until the open jaws 33 reach a position, as shown in dotted lines in FIG. 10, adjacent a lamp 12 held by the head 9 of the exhaust machine 7. Since the bell-crank lever 43 normally has its roller 44 in meshing engagement with the operating arm 45 of the small rod-like piston 47 both pistons move as a unit until the open jaws 33 reach this outermost dotted-line position of FIG. 10 adjacent the lamp 12.

In such position the free end of the bell-crank lever 43 will then be disposed beneath a second air-piston 56, also carried by the transfer device 5 adjacent the "pick-up" station, which is then pressurized to cause downward movement thereof into engagement with the lever 43 and causing its roller 44 to ride out of the slotted end of the operating arm 45. Release of such operating arm thus causes the previously compressed spring 48 to expand and move the rod-like piston 47 relative to the main piston 36. The end of the piston 47 thus disengages the roller 52 allowing the compressed coil springs 50 to expand with attendant rotation of the clamping jaws 33 about their respective pivots until such jaws securely grip the lamp 12. Thereupon the air-piston 55 is depressurized allowing the expanded coil spring 37 to again draw the main piston 36 back into the hollow of the turret 34 and placing the lamp 12 in the dotted line position shown in FIG. 8. However, the bell-crank lever 43 remains in its tripped position, as shown by the dotted lines in FIG. 8, until the head 6 carrying the lamp 12 has indexed through the several work performing stations indicated by the legends in FIG. 1 and reaches its discharge station adjacent the "load" station of the basing and seasoning machine 8, as seen in FIG. 9.

Immediately upon arrival of the head 6 at its discharge station with the lamp 12 in the position shown in dotted lines in FIG. 9, an air-piston 57 is thereupon pressurized to cause outward movement of its piston into engagement with the angularly disposed operating arm 40 of the main piston 36 again forcing the latter outwardly of the hollow in the turret 34 and expanding the spring 37. The composite discharge means thus move the lamp 12 into the "load" position of the basing machine. A plunger 58 carried by the basing machine 8 is then actuated causing it to depress a spring-biased chuck 59 of the head 10 into engagement with the end of the lamp 12 (with a similar operation at the lower end of the head 10 not being shown) where such chuck is held in place against the potential energy of its spring by means of a head-latch 60. Following latching of the lamp 12 in the head 10 of the basing and seasoning machine 8 a further air-piston 62 is pressurized to again cause depression of the small roller 44 into the slotted end of the open bell-crank lever 43 to latch it in place. In so doing the small rod-like piston 47 is forced outwardly of the main piston 36 compressing the coil spring 48 as well as the springs 50 due to its outermost end contacting the roller 52 which in turn causes rotation of the clamping jaws 33 about their respective pivots to their open position thereby releasing engagement with the lamp 12 then secured to the head 10 of the basing and seasoning machine. Such lamp 12 is thereafter indexed through the several stations of the basing machine where the cemented bases at each end are "cured" and the lamp is "seasoned" in the usual manner well known in the art.

The modification of the present invention as shown in FIGS. 2, 4, 11 and 12, differs from that previously described in that the heads 6 of the transfer device 5 as they index two at a time are movable by a cam 70 of the transfer device 5 into the arcuate path of movement of the indexing heads 9 of the exhaust machine 7 as well as the arcuate path of movement of the indexing heads 10 of the basing machine 8, as shown in FIGS. 2 and 4. Although the heads 6 of the transfer device 5 are again of an odd number and closely spaced as in the embodiment of FIG. 1, they are so related to the spacing between the heads 9 of the exhaust machine 7 and the heads 10 of the basing machine 8, that those heads 6 which by-pass the "unload" index station of the exhaust machine and the "load" index station of the basing maching, pass between the heads 9 and 10 even though on a coinciding arcuate path therewith, as can be seen particularly in FIG. 4. Moreover, the operation of the transfer device 5 compensates for the difference in spacing between the heads 9 of the exhaust machine 7 and the heads 10 of the basing machine 8.

Figure 12:
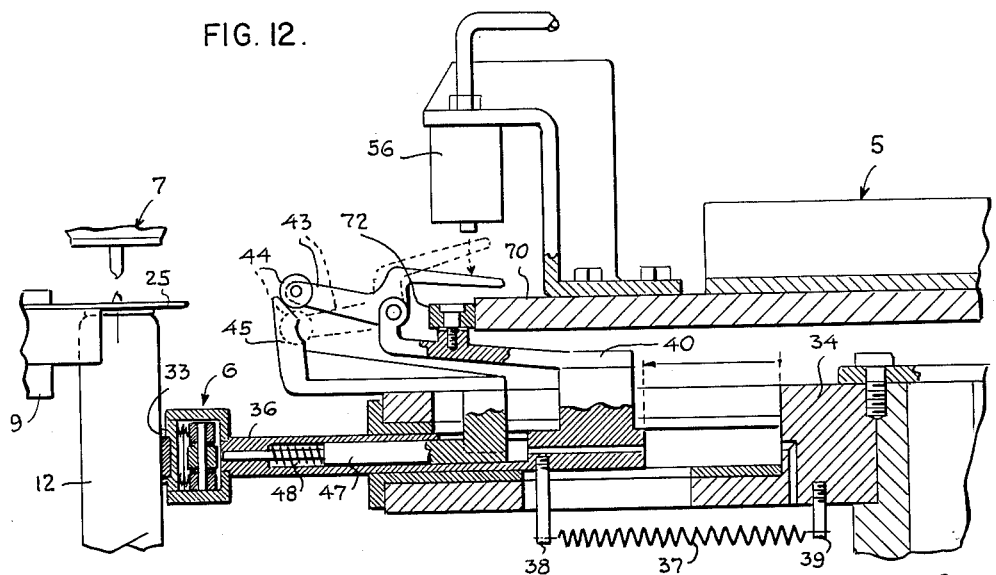
FIG. 12 is a fragmentary vertical cross-sectional view taken on line XII—XII of FIG. 11 of one of the lamp supporting heads of the modification of the transfer device shown in FIG. 2 also adjacent a lamp supporting head of the exhaust machine with both such heads in their indexed pick-up position.

By reference to FIGS. 11 and 12 it will be noted that the structure of the head 6 differs from that employed in the embodiment of FIG. 1 only in the substitution of the cam 70 on the transfer device 5 in lieu of the air-piston 55. Also, in this instance the angularly disposed operating arm 40 is provided with a small roller 72 which rides on the cam 70 to thus cause reciprocatory movement of the main piston 36 within the hollow of the turret 34 as did the air-piston 55. In all other respects the clamping jaws 33 and the small rod-like piston 47 are operated precisely in the same manner as previously described relative to FIGS. 8, 9 and 10. It is to be further noted, however, that the shape of the cam 70 is so orientated and dimensioned that engagement of the roller 72 therewith provides for the lamp 12 carried in the arcuate path of the head 9 of the exhaust machine coinciding with the arcuate path of the clamping jaws 33 after such lamp has passed into the open jaws so that when the lamp 12 reaches its "unload" indexed position it will then be centralized within the jaws 33 and subsequently clamped thereby as seen in FIGS. 11 and 12.

In the modification of FIGS. 3, 13 and 14 the turret of the transfer device 5 as therein disclosed comprises a pair of double sprockets 80 and 82 for driving double superimposed endless chains 83 thereabout. Such chains 83 carry the heads 6 which again are of an odd number and index two at a time into coinciding arcuate paths with the heads 9 of the exhaust machine 7 and the heads 10 of the basing machine 8, as seen particularly in FIG. 3, and again compensate for the difference in head spacing of the exhaust and basing machines. As shown in FIG. 14, the heads 6 of the transfer device 5 comprise a vertically disposed plate 84 having a short horizontally extending top 85 and bottom (not shown) to which the heads 6 are suitably secured as by bolts 86. Each head is secured to the links of the chains 83 by welded angle irons or the like 87 and a roller 88 protruding from each head 6 rides on a track 89 secured to the transfer device 5 to maintain the heads 6 in their proper vertically aligned position. Accordingly, as the double sprockets 80 and 82 are rotated by their drive-shafts 90 their meshing engagement with the double chains 83 causes movement of the latter through the path shown in FIG. 3 to thus index every other head 6 into its pick-up position coinciding with the "unload" position of the head 9 of the exhaust machine.

When such head 6 arrives at its pick-up position the clamping jaws 33 will be in their open position due to compression of the coil springs 50 by the lower end of a pivoted spring pressed rocker arm 92 then bearing against the roller 52 and held in place by a pivoted spring pressed latch 93. Also the lamp 12 will be positioned in the clamping jaws 33 having passed therein as such lamp and the jaws approached their coinciding arcuate path, in the same manner as previously described relative to the modification of FIG. 2. Upon the head 6 coming to rest at its indexed pick-up position the spring pressed latch 93 will then be disposed immediately beneath a plunger 94 carried by the transfer device 5. The latter is immediately moved downwardly into contact with the spring pressed latch 93, then in its dotted line position as shown in FIG. 14, causing disengagement thereof with the spring pressed rocker arm 92. This allows the potential energy of its spring to rotate such arm 92 (in a counterclockwise direction as seen in FIG. 14) away from contact with roller 52 whereby the compressed springs 50 then cause rotation of the clamping jaws 33 about their respective pivots into gripping engagement with the lamp 12, as seen in FIG. 13.

Again the heads 6 then index through the several work performing stations as shown by the legends in FIG. 1 until such head with a partially fabricated lamp 12 is indexed into its discharge position adjacent the "load" station of a head 10 of the basing machine. Here a plunger (not shown but similar to the plunger 94) is carried by the transfer device 5 above the spring pressed rocker arm 92 which is immediately moved downwardly into contact therewith to cause rotation thereof with its lower end again engaging the roller 52 to compress the springs 50 and open the jaws 33 thereby releasing the lamp 12. At the same time the slight rotation of the rocker arm 92 causes the spring pressed latch 93 to snap into its locking engagement with the rocker arm 92 to hold it in place upon retraction of the plunger and until again tripped by operation of the plunger 94 at the pick-up position of the head 6.

It should thus become apparent to those skilled in the art from the foregoing that a novel transfer device has been herein shown and described which preferably is provided with an odd number of lamp supporting heads indexing two stations at a time. A lamp is picked up by a head when indexed into a position adjacent the "unload" station of an exhaust machine with the transfer device and its article supporting head then rotating more than one complete revolution. During rotation thereof work operations are performed on the lamp at one side of the transfer device and after inverting the lamp similar work operations are performed on the other end thereof at the opposite side of the transfer device. Thereafter the lamp is transferred from the device when a head thereof is indexed into a position adjacent a "load" position of a basing and seasoning machine with such transfer device compensating for the difference in head spacing of the exhaust and basing machines. By thus providing the transfer device with an odd number of heads and indexing them two at a time a more compact transfer device is produced thus resulting in a decrease in required floor area for the entire lamp manufacturing machine group and also reducing manufacturing costs of the lamp.

From the foregoing description, it can be seen that three factors are important in determining that the article being transferred initially passes the pick-up or "load" position of the basing machine, to enable work positions to be located completely around the transfer unit. These factors are: (1) the number of evenly spaced heads on the transfer conveyor, such as 27 in the apparatus shown in FIG. 1; (2) the number of heads positioned at and between the discharge station of the first machine and the pick-up station of the second machine, such as 16 in the apparatus embodiment shown in FIG. 1; and (3) the individual index distance through which each head is moved, such as a distance of "two heads" in the apparatus embodiment shown in FIG. 1.

Many alternative embodiments are possible. For example, if the apparatus shown in FIG. 1 were to be indexed each time through a spacing of four heads, rather than two heads as described, each head would be loaded at station 1, and would index successively to stop at stations indicated by heads 5, 9, 13, 17, 21, 25, 2, 6, 10, 14, 18, 22, 26, 3, 7, 11, 15, 19, 23, 27, 4, 8, 12 and 16, the "unload" station. This would include more than three and one-half revolutions of the transfer conveyor through its closed path.

The possible combinations of the three variables as set forth hereinbefore are very numerous. For example, consider a conveyor which had sixteen heads, with "load" position at station 1, "unload" position at station 8 and an index distance of three heads. An article transferred by such a device would complete two and one-half traverses of the closed path of the transfer unit before arriving at the discharge station.

The transfer device of the present invention can be summarized by noting that the conveyor carries a first predetermined number of heads. A second predetermined number of heads are positioned at and between the discharge station of the first machine and the pick-up station of the second machine, and the heads are indexed through individual index distances each comprising the spacing between a predetermined multiple of the heads, such as the spacing between two heads, for example. These three factors bear such numerical relationship to one another that each head, after being indexed to stop proximate the discharge station of the first machine to receive an article for transfer, is indexed at least once through the entire closed path of the conveyor, and will not again stop proximate the discharge station of the first machine until the head is first indexed to stop proximate the pick-up station of the second machine, to complete the article transfer. Thereafter the head receives another article for transfer.

Although several embodiments of the present invention have been herein shown and described, it is to be understood that still further modifications thereof may be made without departing from the invention.

We claim:
1. A transfer device for automatically picking up a partially fabricated article from a first machine and transferring it to a second machine comprising:
   (a) a movable turret,
   (b) a plurality of spaced heads of uneven number carried by said turret for supporting said partially fabricated article,
   (c) means operable to cause intermittent movement of said turret with attendant indexing of said heads two at a time to position every other head at a pick-up station adjacent an unload station of said first machine for receiving an article in said head,
   (d) said means being also operable to simultaneously index every other article-carrying head into work-performing positions spaced two stations apart on each side of the path of movement of said turret to enable tooling to perform operations on the article carried by said head when indexed to said work-performing stations,
   (e) and means operable to release said partially fabricated article when each article-carrying head arrives at its discharge index station adjacent a load position of said second machine after having indexed through all the work-performing stations on both sides of said transfer device.

2. A transfer device for automatically picking up a partially fabricated article from a first machine and transferring it to a second machine comprising:
   (a) a movable turret,
   (b) a plurality of spaced heads of uneven number carried by said turret for supporting said partially fabricated article,
   (c) means operable to cause intermittent movement of said turret with attendant indexing of said heads two at a time to position every odd number head at a pick-up station adjacent an unload station of said first machine for receiving an article in said odd number head,
   (d) said means being also operable to simultaneously index every odd number article-carrying head into work-performing positions spaced two stations apart on each side of the path of movement of said turret to enable tooling to perform operations on the article carried by said odd number head when indexed to said work-performing stations,
   (e) and means operable to release said partially fabricated article when each article-carrying head arrives at its discharge index station adjacent a load position of said second machine after having indexed through all the work performing stations on both sides of said transfer device.

3. A transfer device for automatically picking up a partially fabricated article from a first machine and transferring it to a second machine comprising:
   (a) a movable turret,
   (b) a plurality of spaced heads of uneven number carried by said turret for supporting said partially fabricated article,
   (c) means operable to cause intermittent movement of said turret with attendant indexing of said heads two at a time to position every odd number head at a pick-up station adjacent an unload station of said first machine for receiving an article in said odd number head, (d) said means being also operable to simultaneously index every odd number article-carrying head into work-performing positions spaced two stations apart on each side of the path of movement of said turret to enable tooling to perform operations on the article carried by said odd number head when indexed to said work-performing stations, (e) and means operable to release said partially fabricated article when each even number article-carrying head arrives at its discharge index station adjacent a load position of said second machine after having indexed through a path of movement greater than 360°.

4. A transfer device for automatically picking up a partially fabricated article from a first machine and transferring it to a second machine comprising:

(a) a movable turret, (b) a plurality of spaced heads of uneven number carried by said turret for supporting said partially fabricated article, (c) means operable to cause intermittent movement of said turret with attendant indexing of said heads two at a time to position every odd number head at a pick-up station adjacent an unload station of said first machine for receiving an article in said odd number head, (d) said means being also operable to simultaneously index every odd number article-carrying head into work-performing positions spaced two stations apart on each side of the path of movement of said turret to enable tooling to perform operations on the article carried by said odd number head when indexed to said work-performing stations, (e) and means operable to release said partially fabricated article when each even number article-carrying head arrives at its discharge index station adjacent a load position of said second machine after having indexed through all the work performing stations on both sides of said transfer device and said turret has moved all said article-carrying heads about an axis approximately one and one-half times from their pick-up index station.

5. A transfer device for automatically picking up a partially fabricated article from a first machine having spaced article-supporting heads and transferring it to a second machine having article-supporting heads of a different spacing than said first machine comprising:

(a) a movable turret, (b) a plurality of spaced heads of uneven number carried by said turret for supporting said partially fabricated article, (c) means operable to cause intermittent movement of said turret with attendant indexing of said heads two at a time through a coinciding arcuate path of movement with the spaced heads of said first machine to position every odd number head at a pick-up station adjacent an unload station of said first machine for receiving an article in said odd number head, (d) said means being also operable to simultaneously index every odd number article-carrying head into work-performing positions spaced two stations apart on each side of the path of movement of said turret to enable tooling to perform operations on the article carried by said odd number head when indexed to said work-performing stations, and said means being thereafter operable to index each even number head through a compensating coinciding arcuate path of movement with the differently spaced heads of said second machine, (e) and means operable to release said partially fabricated article when each even number article-carrying head arrives at its discharge index station adjacent a load position of said second machine after having indexed through all the work-performing stations on both sides of said transfer device.

6. A transfer device for automatically picking up a partially fabricated article from a first machine having spaced article-supporting heads and transferring it to a second machine having article-supporting heads of a different spacing than said first machine comprising:

(a) a movable turret, (b) a plurality of spaced heads of uneven number carried by said turret for supporting said partially fabricated article, (c) means operable to cause intermittent movement of said turret with attendant indexing of said heads two at a time through a coinciding arcuate path of movement with the spaced heads of said first machine to position every odd number head at a pick-up station adjacent an unload station of said first machine for receiving an article in said odd number head, (d) said means being also operable to simultaneously index every odd number article-carrying head into work-performing positions spaced two stations apart on each side of the path of movement of said turret to enable tooling to perform operations on the article carired by said odd number head when indexed to said work-performing stations, and said means being thereafter operable to index each even number head through a compensating coinciding arcuate path of movement with the differently spaced heads of said second machine, (e) and means operable to release said partially fabricated article when each even number article-carrying head arrives at its discharge index station adjacent a load position of said second machine after having indexed through all the work-performing stations on both sides of said transfer device and said turret has moved all said article-carrying heads about an axis approximately one and one-half times from their pick-up index station.

7. A transfer device for picking up partially fabricated articles at the discharge station of a first machine and discharging the articles at the pick-up station of a second machine, and during such transfer said device indexing the articles through a closed path and to and from a plurality of work stations positioned proximate the index path, said device comprising:

(a) a transfer conveyor movable through a closed path and positioned between the discharge station of said first machine and the pick-up station of said second machine, (b) a plurality of evenly spaced heads of odd number carried by said conveyor for receiving and supporting said partially fabricated articles, with an even number of said heads positioned on the path of movement of said conveyor between and including the discharge station of said first machine and the pick-up station of said second machine, (c) indexing means operable to move said conveyor with an indexing motion to move said heads through an individual index distance equal to the spacing between two of said heads, as measured along the path through which said heads are indexed, (d) pick-up means operable to transfer an article from the discharge station of said first machine to a head of said transfer device when such head is indexed to position proximate the discharge station of said first machine, (e) a plurality of work means positioned along the path of movement of said conveyor to perform work operations on partially fabricated articles carried by said heads during stationary periods between individual indexes of said heads, and (f) discharge means operable to transfer an article from a head of said device when such head is indexed to position proximate the pick-up station of said second machine.

8. A transfer device for picking up partially fabricated articles at the discharge station of a first machine and discharging the articles at the pick-up station of a second machine, and during such transfer said device indexing the articles through a closed path and to and from a plurality of work stations positioned proximate the index path, said device comprising:

(a) a transfer conveyor movable through a closed path and positioned between the discharge station of said first machine and the pick-up station of said second machine, (b) a plurality of evenly spaced heads of first predetermined number carried by said conveyor for receiving and supporting said partially fabricated articles, with a second predetermined number of said heads positioned on the path of movement of said conveyor between and including the discharge station of said first machine and the pick-up station of said second machine, (c) indexing means operable to move said conveyor with an indexing motion to move said heads through an individual predetermined index distance equal to the spacing between a predetermined multiple of said heads, as measured along the path through which said heads are indexed, (d) pick-up means operable to transfer an article from the discharge station of said first machine to a head of said transfer device when such head is indexed to position proximate the discharge station of said first machine, (e) a plurality of work means positioned along the path of movement of said conveyor to perform work operations on partially fabricated articles carried by said heads during stationary periods between individual indexes of said heads, (f) discharge means operable to transfer an article from a head of said device when such head is indexed to position proximate the pick-up station of said second machine, and (g) said first predetermined number of said heads, said second predetermined number of said heads, and said predetermined individual index distance through which said heads are moved, bearing such numerical relationship to each other that each said head, after being indexed to stop proximate the discharge station of said first machine to receive an article for transfer is indexed at least once through the entire closed path of said conveyor and will not stop proximate the discharge station of said first machine until after each such head is indexed to stop proximate the pick-up station of said second machine to complete the article transfer, and each such head is thereafter indexed to stop proximate the discharge station of said first machine again to re-receive an article for transfer.

No references cited.

HUGO O. SCHULZ, *Primary Examiner.*